Figure 1:
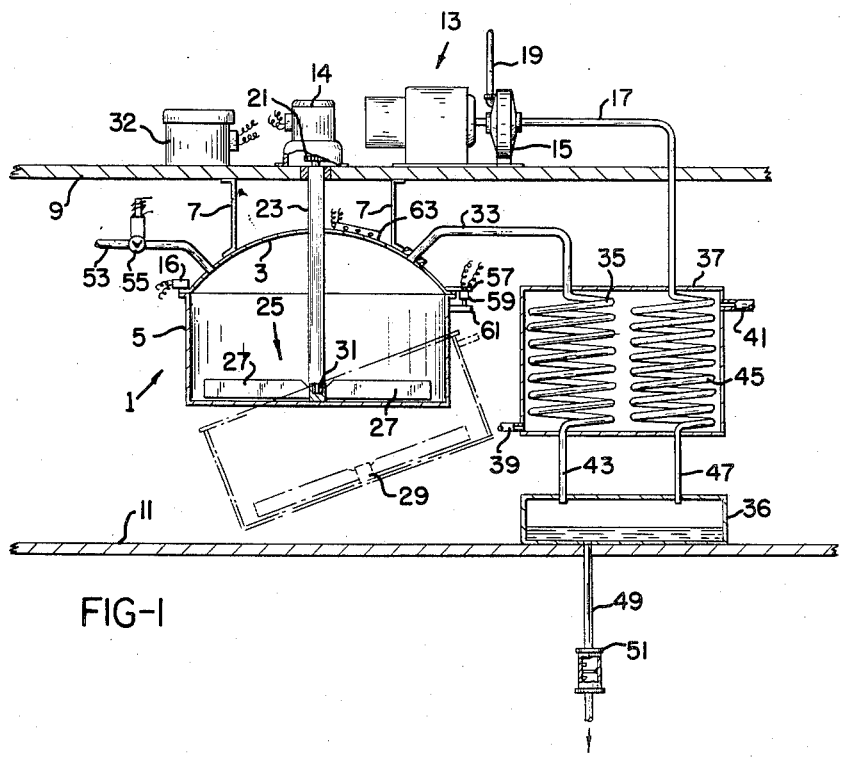

Sept. 16, 1958 T. L. BEACH, JR 2,851,940
CORN POPPING APPARATUS
Filed July 20, 1956

INVENTOR.
THEODORE L. BEACH JR.
BY Toulmin & Toulmin
ATTORNEYS

United States Patent Office 2,851,940
Patented Sept. 16, 1958

2,851,940

CORN POPPING APPARATUS

Theodore L. Beach, Jr., Donnelsville, Ohio

Application July 20, 1956, Serial No. 599,190

2 Claims. (Cl. 99—238)

This invention relates to the production of pop-corn and is particularly directed to novel apparatus and novel methods for producing pop-corn.

This application is a continuation-in-part of my co-pending application, Serial No. 349,567, filed April 17, 1953, now abandoned.

Corn kernels which are utilized commercially for popping must meet rather exacting requirements, particularly as to moisture content. Thus in the normal production of pop-corn every effort is made to obtain kernels having approximately 13.6 to 14 percent moisture initially, which moisture content, during the heating of the corn to effect popping, is considerably reduced. Thus a moisture percent of about 2.5 to 4.5 exists in a desirably popped product and corn having a moisture content in this range is considered a suitable edible for marketing. It may be noted that in this usual popping process the popping and expulsion of moisture are accompanied by a 30 volume increase in the corn kernel.

Corn, which in the unpopped state has a moisture content in excess of about 15 percent by weight, has generally been considered unsuitable for commercial popping purposes, for when such is employed in the usual processes the popped corn is hard and substantially inedible. Lower moisture content corn than about 13–14 percent is not employed as such corn does not attain the volume increase necessary to the attainment of good popped corn.

The necessity for attaining the corn in the noted percentage range and for maintaining it in that range under all conditions of storage, which as is well known vary materially from locality to locality and season to season, results in much expense. For example, field corn or cleaned corn generally contain moisture to the extent of about 21–24 percent by weight; to prepare this corn for popping this moisture content must be processed down into the desirable range of 13.6 to 14 percent by weight. The high moisture corn exhibits a resistance to the drying action and the resistance increases materially as lower moisture contents are approached.

Moreover, such processed corn must be carefully packed and stored to avoid pick-up of moisture to any degree since such a pick-up may render the corn unusable. Since such storage conditions, particularly those prevailing in transit, are not readily predictable, the present commercial practice involves processing the corn to the desired range, packaging as carefully as cost consideration will permit and trusting to the existence of favorable humidity conditions.

It is an important object of this invention to provide novel apparatus which is capable of utilizing the high moisture content corn referred to hereinbefore.

It is still another object of this invention to describe novel apparatus for the popping of corn kernels under vacuum conditions, which apparatus is readily positionable within a small spacing, composed of relatively few readily assembled components, and which apparatus is particularly adapted for use in production machines such as are found in theatre lobbies, roadside stands, and similar structures where space is generally at a premium.

These and other allied objectives of the present invention are attained by employing for popping purposes a corn having a moisture content in the range of 15–17 percent by weight. Such corn hitherto has been substantially a useless material in the commercial pop-corn field—however, I have found that when corn is popped under vacuum conditions that not only is the volume expansion of the corn improved but a vastly improved product of superior taste, texture and tenderness results. Corn having a moisture content of between about 15.5 to 17 percent yields these desirable features when corn is popped under vacuum conditions.

Figure 2:
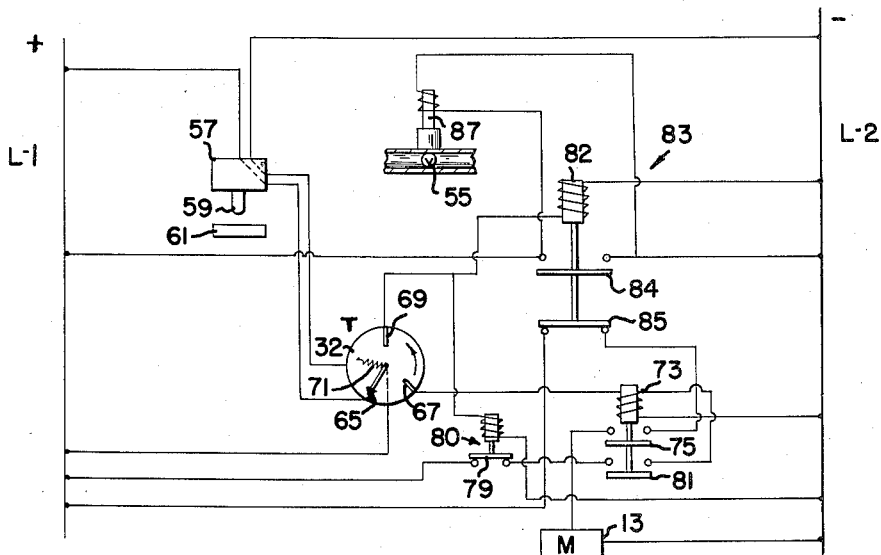

This invention will be more fully understood by reference to the following detailed description and accompanying drawing wherein:

Figure 1 schematically illustrates apparatus useful in the practice of the invention; and Figure 2 schematically illustrates an electric circuit arrangement useful in the operation of the structure of Figure 1.

Referring now to the drawings, the numeral 1 in Figure 1 generally designates a sealable cooking container for corn kernels and the container comprises a cover 3 and a receptacle 5 which is movable, preferably pivotally, with respect to the cover. Supports indicated at 7 rigidly retain the cover and the supports depend from a transverse bracing 9. Bracing 9 may suitably form a shelf in the instance of the unit useful for theatre lobbies, for example.

Below the container 1 is a counter 11 onto which corn popped in the container may fall to be conveniently accessible for packing into bags or for storage if desired.

Shelf or transverse bracing 9 supports an electric motor indicated at 13 and which motor is operably associated with a vacuum pump 15 having an inlet line 17 and an exhaust line indicated at 19. A second electric motor 14 is operably connected through a switch 16 and is actuated upon closing of the container; the electric motor 14 through suitable gearing 21 drives a shaft 23 which passes in air-tight relation through cover 3.

Provided in the receptacle 5 is a stirrer 25 having vanes 27 secured to and extending from a hub 29 rotatably journaled in the receptacle 5. Shaft 23 is suitably provided at its lower end 31 with internal splines which cooperate with the hub to effect rotation of the stirrer and which are readily detachable from the hub when receptacle 5 is withdrawn from the cover 3.

Also positioned on the bracing 9 is a suitable timing device 32 which is actuable automatically to limit the time of the application of vacuum to the interior of the container 1. Rightwardly as shown in Figure 1 the cover 3 has associated therewith in air-tight relation a conduit 33 which extends vertically downward and is formed into a coil 35. Coil 35 is positioned in a housing 37 having a cooling water inlet 39 and a water outlet 41. Below the housing 37 is a discharge tank 36 in which the lower end 43 of coil 35 terminates.

Pump inlet line 17 is also formed into a condenser coil 45 positioned in the housing 37 and this coil has a lower end 47 which also terminates in the discharge tank 36. Depending from the tank 36 is a drain conduit 49 provided with a pressure responsive valve 51.

It may be noted that when a vacuum condition exists in the discharge tank 36 the valve 51 will be closed and when the vacuum condition is broken in the tank 36 valve 51 will automatically open to empty the contents of the discharge tank 36.

Referring again to cover 3, conduit 53 in air-tight relation with the cover contains a normally closed valve 55 through which the interior of the container 1 is communicable with the atmosphere in the open position of the valve.

Cover 3 also retains a normally open switch 57 operably connected to power lines L-1 and L-2 (Figure 2). The switch includes a plunger 59 and the plunger is actuable through an actuator 61 carried on the receptacle 5 which is adapted to engage the plunger when the cover and receptacle are in sealed relation.

Also suitably mounted between the cover 3 and the bracing 9 is an electric heater designated generally at 63. Heater 63 is normally operated to provide a temperature of about 450–500° F. in the receptacle 5.

Referring now to the operation of the device and also to Figure 2 of the drawings, corn kernels to initiate the operation are placed in the receptacle 5 when the same is at the noted temperature of about 450–500° F. The container is closed manually by moving receptacle 5 upwardly, and closure of the container causes the actuator 61 to engage the plunger 59 and line voltage (Figure 2) is applied to the timer 32. The timer 32 may be any suitable timing device which is settable to limit the time of application of vacuum to the container 1.

As shown in Figure 2 the timer is indicated to be of the clock type in which a movable hand 65 energized between L-1 and L-2 and acting through suitable mechanism (not shown) makes a first contact at 67 and a second contact at 69. A suitable spring 71 normally biases the clock hand 65 to an inoperative position and as shown in the drawing the hand is biased considerably leftwardly of the first contact 67 to provide a heating time of the corn kernels prior to the application of vacuum. In practice this heating time is normally about 20 seconds.

Contact 67 is electrically connected to a relay 73 having a normally open blade 75. When the coil of relay 73 is energized by movement of hand 65 to contact 67, motor 13 is actuated, as is the pump 15 which is mechanically connected to the motor, as indicated by the dotted line in Figure 2.

Blade 79 of relay 80 is normally closed and through blade 81, which blade closes with blade 75 of relay 73, provides a holding contact to maintain motor 13 operative as the timer hand continues to rotate from the contact 67.

As motor 13 drives pump 15 the interior of the container 1 is evacuated. While evacuation may commence immediately upon the closure of container 1, more suitably a time delay of about 20 seconds is provided to permit the corn kernals to come up to temperature; the vacuum is then applied while the corn kernels are fully heated and the result in volume is slightly greater than if the vacuum were applied immediately upon closing of the container. The stirrer 25, as shown in Figure 1, agitates the corn during the heating period and revolves at a speed of approximately 15 to 20 R. P. M.

With the application of vacuum the heated kernels burst, evolving steam and other volatile constituents which pass to coil 35 and are there condensed. The vacuum is applied through coil 45, through discharge tank 36 and coil 35, and accordingly condensation of the volatiles takes place under vacuum conditions. Since the volatiles are highly heated and are under low pressure conditions some volatiles tend to pass to coil 35. The coil 45 is effective to condense volatile material emanating from the discharge tank 36 towards the pump. The materials passing to the coil 45 being condensed are returned to the tank 36 under the influence of gravity. The vacuum conditions at the instant of popping are suitably at least 18 to 20 inches of mercury, and as the volatile material is withdrawn the vacuum increases to about 27 to 28 inches.

The cooling coil arrangement thus described, plus the effect of gravity, is sufficient to substantially completely condense all of the volatiles which drain to the discharge tank 36. While the vacuum condition is applied the valve 51 is drawn closed due to the pressure across it of the atmosphere (at drain pressure) on one side and the vacuum pressure on the other, and accordingly the draining liquid tends to remain in tank 36 temporarily. When the popping has been completed and hand 65 makes contact with the second contact 69 line voltage is applied across the coil 82 of relay 83 and blade 84 is closed while blade 85 is opened. Similarly, blade 79 of relay 80 is opened and the motor is then deenergized since blade 81 also opens.

Closure of blade 84 provides line voltage across coil 87 of the valve 55 opening the valve and thus permitting air to enter the container 1. The container may then be readily opened. With the admission of air to the container the vacuum line to the pump is destroyed and atmospheric pressure exists in the discharge tank 36. Accordingly valve 51 will open and the condensed materials will pass readily to drain.

Thus in the operation of the device the expulsion of volatiles from the corn and the passage of condensed volatiles to waste is accomplished in one cycling of the equipment. At the end of the noted cycling the equipment is again ready for another charge of corn kernels.

In the practice of the invention I prefer to use corn kernels having a moisture content of at least 15.5 percent and up to about 17 percent by weight. This moisture content is an important feature of the invention as it permits the attainment of popping volume in commercial practice of 39 to 40, and frequently as high as 42 to 44.

Identical corn kernels when popped in the normal commercial manner at atmospheric pressure yield a very low volume, generally less than 30; I have found that the best popping volume attainable in conventional practice, when the moisture content of the corn is 15.5 to 17 percent is about 30, and that normally the volumes are lower.

Accordingly it is quite surprising to find that under vacuum conditions popping volumes of 39 to 40 and above are readily attainable with 15.5 to 17 percent moisture corn.

In this connection it is to be noted that in conventional practice volumes of about 30 to 32 are attainable when the commercial recommended moisture content is 13.6 percent plus or minus 0.3 percent.

With a corn kernel moisture content of about 15.5 percent and employing the vacuum method described popping volumes of 39 to 40 are consistently attained on a commercial basis. Above about 16 percent to 16.5 percent the volumes commercially attainable are customarily higher than 40 and frequently in the range of 42 and 44.

The following are representative data attained when the corn kernels are heated for about 20 seconds before the application of vacuum as has been described in connection with the apparatus and method set out hereinbefore:

| Moisture Percent of Raw Grain | Measurement of the Finished Product | Initial Moisture Percent of Finished Product |
| --- | --- | --- |
| 15.5 | 39 | 3.0 |
| 16.0 | 40 | 3.4 |
| 16.4 | 40+ | 3.57 |

The volumes attained above are only slightly reduced when the vacuum is applied as the container is closed and the heating takes place substantially entirely in vacuum.

In making the determination or tests referred to hereinbefore the quantity of corn employed and the quantity of oil utilized to prevent sticking of the product to the heating container were identical.

To procure the 15.5 to 17 percent moisture corn kernels conventional dehydrating processes as normally practiced in this field may be employed, it being only necessary to stop the dehydrating action at the predetermined moisture percentage. Thus a considerable saving in time and power requirements is effected over the conventional processes involving roasting which must reduce the moisture percent to at least 14 percent.

It is also to be understood that usual procedures for hydration of corn, that is increasing the moisture content into the range of 15.5 to 17 percent by weight, may also be employed.

The kernels thus produced have less tendency to regain moisture since less of the normally occurring moisture has been taken therefrom and accordingly packaging and storage problems are minimized.

Popped corn produced from either end of the 15.5 to 17 percent range have substantially the same characteristics of improved taste, texture, tenderness and volume. It is believed in this connection the larger moisture content of the kernels permits the development of greater explosion pressures and that the heat released by the expanding steam occasions the volatilization and expulsion of oily and nitrogeneous constituents; this leaves in the product less matter which may harden at room temperature and contributes to the tenderness and texture of the pop-corn. Further the higher pressures developable internally of the kernel cause those portions of the body which most resist expansion to respond favorably, leading to the attainment of an improved white starch edible material.

Corn for popping purposes, since it contains moisture, is normally subject to mildew and the same precautions, in this respect, should be taken with a 15.5 percent to 17 percent corn as they are taken in connection with the usual commercial corn for popping purposes.

It will be understood that this invention is susceptible to modification in order to adapt it to different usages and conditions and accordingly, it is desired to comprehend such modifications within this invention as may fall within the scope of the appended claims.

I claim:

1. In corn popping apparatus, a sealable cooking container for corn kernels, a discharge tank positioned below said container, vacuum producing apparatus, a first condenser coil communicating the interior of the container with the interior of the discharge tank, a second condenser coil communicating the interior of the discharge tank with the vacuum producing apparatus, the second coil extending above and in substantially vertical relation to the discharge tank and having unimpeded communication with the discharge tank, a drain conduit depending from the discharge tank, and a pressure responsive valve in the drain conduit closable upon application of vacuum pressure to the discharge tank.

2. In corn popping apparatus, a sealable cooking container for corn kernels, a discharge tank positioned below said container, vacuum producing apparatus, a first condenser coil communicating the interior of the container with the interior of the discharge tank, a second condenser coil communicating the interior of the discharge tank with the vacuum producing apparatus, the second coil extending above and in substantially vertical relation to the discharge tank and having unimpeded communication with the discharge tank, a drain conduit depending from the discharge tank, and a check valve in the drain conduit closable upon application of vacuum pressure to the discharge tank, said check valve being openable automatically to drain the discharge tank upon removal of vacuum pressure from the discharge tank.

References Cited in the file of this patent

UNITED STATES PATENTS

| | | |
|---|---|---|
| 1,104,990 | Harding | July 28, 1914 |
| 1,647,483 | Suzuki | Nov. 1, 1927 |
| 1,938,981 | Smith | Dec. 12, 1933 |
| 2,241,574 | Wilsey | May 13, 1941 |
| 2,536,298 | Manley | Jan. 2, 1951 |

FOREIGN PATENTS

| | | |
|---|---|---|
| 130,673 | Australia | Dec. 17, 1948 |